May 5, 1964
E. R. JAHNS
WIDTH CONTROL
Filed July 1, 1960
3,132,283
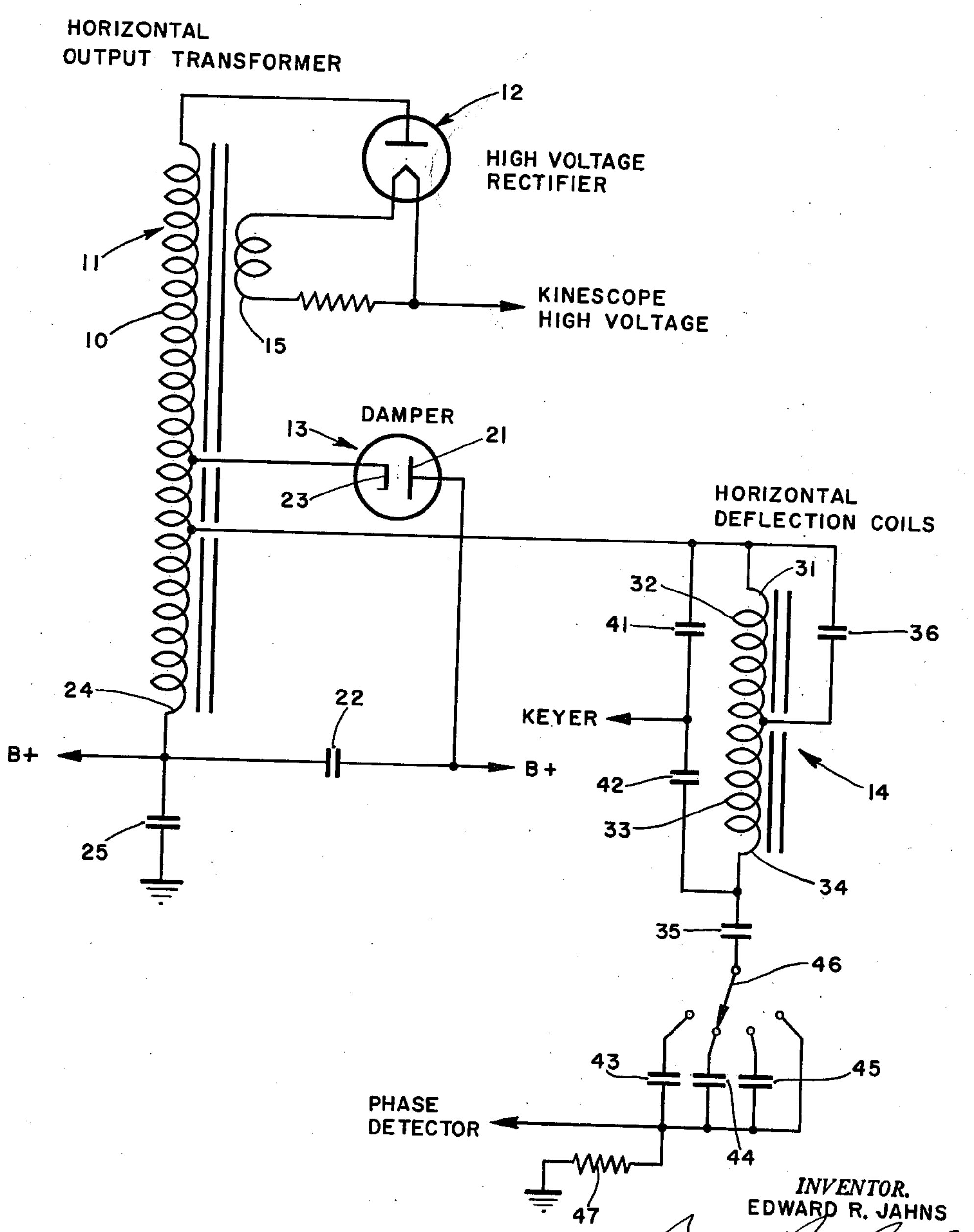
*INVENTOR.*
EDWARD R. JAHNS
BY
ATTORNEY.

United States Patent Office 3,132,283
Patented May 5, 1964

3,132,283
WIDTH CONTROL

Edward R. Jahns, Los Angeles, Calif., assignor to Hoffman Electronics Corporation, a corporation of California Filed July 1, 1960, Ser. No. 40,311
3 Claims. (Cl. 315—27)

The present invention relates to television receivers, and more particularly to a means for adjusting the width of the raster of a television picture tube.

The width of the raster of a television picture tube is directly proportional to the line voltage supplied to the television receiver. Line voltage differs from one geographical area to another, and thus, in order to fill the tube properly with the raster, it becomes necessary to adjust the width of the raster in accordance with the line voltage available in the particular area involved. It is also desirable for the person viewing the television receiver to be able to adjust the width of the raster when he desires to either enlarge or decrease the picture area, in order to obtain the effect of using a telephoto lens.

When the width of a picture tube raster is increased, the electron beam must move faster, in order to cover the greater horizontal distance in the same time as previously. The faster moving electron beam cannot energize the phosphors for as long a time as before, and the resulting picture, although wider, is dimmer. Since the widening of the raster automatically decreases the brightness of the picture, it is desirable that the means for increasing the width of the viewed image should have a minimum effect on the kinescope ultor voltages, in order to avoid contributing another source of reduced picture brightness.

The width of the raster can be altered by changing the deflection current through the horizontal deflection coils, which current can be changed by the introduction of an impedance in the horizontal output circuit, such as in the secondary of the horizontal output transformer. Since the same system is used to supply both the deflection voltages and the ultor, or high, voltage, any change in the deflection voltages affects the ultor voltage.

In the past, the impedance added in the horizontal output circuit to vary the width of the raster have been either a "width coil" or variable inductance connected across a portion of the horizontal output transformer, a variable resistor connected in the screen grid circuit of the horizontal output tube, or several high voltage capacitors connected across the deflection coils, the picture width being directly proportional to the magnitude of the capacitance.

The problems with a "width coil" are that its cost is high, power is dissipated at all settings of the coil, the high voltage is reduced by several thousand volts over the operating range of the coil, and radiation is increased. The problem with a variable resistor is that it very greatly reduces the high voltage, even more so than the "width coil." The problem with connecting capacitors across the deflection coils is that it considerably reduces the high voltage, it often results in voltage breakdown between the capacitors and the chassis, and it increases radiation. Shielding may be required when using the parallel capacitors, because of the connection to the peak horizontal voltages of from 1500 to 2500 volts. Reduced high voltage results in a dimmer picture and is very undesirable.

It is an object of the present invention, therefore, to provide a novel means for adjusting the width of the raster of a television picture tube.

It is another object of the present invention to provide an inexpensive means for adjusting the width of the raster of a television picture tube over a wide range, whereby there is little reduction in high voltage, voltage breakdown does not often occur, and there is little electromagnetic radiation from the television receiver at the sweeping frequencies.

According to the present invention, the width of the raster of a television picture tube is adjusted by means of capacitors connected in series with the deflection coils.

The features of the present invention which are believed to be novel are set forth with particularity in the appended claims. The present invention, both as to its organization and manner of operation, together with further objects and advantages thereof, may best be understood by reference to the following description, taken in connection with the accompanying drawing, in which:

The sole figure is a schematic diagram showing a circuit according to the present invention.

The sole figure shows primary side 10 of horizontal output transformer 11 connected to high voltage rectifier 12, damper 13, and yoke 14, in that order. The cathode of high voltage rectifier 12 supplies the high voltage to the kinescope, or picture tube, of the associated television receiver, and receives its filament power from secondary side 15 of horizontal output transformer 11. Plate 21 of damper 13 is coupled directly to the B+ terminal of a first power supply of about 260 volts, and through capacitor 22 to a second B+ terminal of about 580 volts, which is the so called "boost" voltage. Cathode 23 is connected to primary 10. End 24 of primary 10 is grounded through capacitor 25 and is coupled to the "boost" B+.

End 31 of horizontal deflection coil 32 is connected to primary 10, while end 34 of horizontal deflection coil 33 is connected to capacitor 35. The other ends of each of coils 32 and 33 are connected directly together, and to end 31 through capacitor 36. The necessity for capacitor 36 depends upon the coil geometry. Ends 31 and 34 are connected together through capacitors 41 and 42, which are coupled to a keyer. Capacitor 35 can be connected to one side of either capacitor 43, 44, or 45 through switch 46. The other side of each of capacitors 43, 44, and 45 is connected directly together, directly to a phase detector, and to ground through resistor 47. Capacitor 35 can also be connected directly to the phase detector through switch 46, bypassing capacitors 43, 44, and 45.

Values of the components shown in the sole figure can be, by way of example, as follows:

| Component: | | Value |
|---|---|---|
| Capacitor 22 | microfarads | .047 |
| Capacitor 25 | do | 4 |
| Capacitor 26 | do | 4 |
| Capacitor 35 | do | .22 |
| Capacitor 36 | micromicrofarads | 100 |
| Capacitor 41 | do | 170 |
| Capacitor 42 | do | 170 |
| Capacitor 43 | microfarads | .02 |
| Capacitor 44 | do | .047 |
| Capacitor 45 | do | .1 |
| Resistor 47 | ohms | 15 |

Capacitors 35, 43, 44, and 45 vary the width of the raster because they change the voltage and current and current phase relationships through the horizontal deflection coils. Since the capacitors are in series with the horizontal deflection coils, the picture width is inversely proportional to the magnitude of the capacitance.

It is common practice to use horizontal-output scanning systems in commercial television receivers wherein the output transformer and yoke present a high impedance circuit tuned to a frequency of 15,750 cycles, in order to be able both to sweep wide angle picture tubes of about 110 degrees and to provide a source of high voltage of about 20,000 volts. Increasing the width of the raster by adding parallel capacitors across the yoke and/or the horizontal output transformer reduces the high voltage by detuning the horizontal output system to a frequency below the optimum of 15,750 cycles. The reduced high voltage renders the kinescope electron beam less "stiff," and a more easily scanned wider picture results. Efficiency is reduced when the load impedance presented to the horizontal output tube, which is operating at 15,750 cycles, is reduced, and the plate current of the tube increases. The overall result of adding capacitors in parallel is that a 40% wider picture is obtained, but it is at the expense of reducing the high voltage many kilovolts.

Adding capacitors in series with the yoke in accordance with the present invention has little effect upon the 15,750 cycle tuned impedance, because of the magnitude of the capacitances. The series-connected capacitors have a negligible effect upon the impedance presented to the horizontal output transformer, and the load and efficiency remain substantially constant. The output tube current in a typical application rises only 4%, and the ultor voltage of 20,000 volts is reduced only 2%, for a 40% increase in sweep magnitude or horizontal picture size. One advantage is that a means is provided for obtaining a normal picture on wide angle tubes than those used at present. Thus, even a 150-degree tube could be accommodated.

By placing the width-control capacitors in series with the horizontal deflection coils, instead of in parallel, an inexpensive means is provided for adjusting the width of the raster over a great range, with little effect being had upon the ultor voltage, in spite of the fact that the same system is used to supply both the deflection and ultor voltages. That is, changes in the horizontal deflection voltage do not appreciably affect the ultor voltage. In addition, radiation is slight, and voltage breakdown is infrequent.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A television receiver comprising: a horizontal output transformer coupled to first and second series-connected horizontal deflection coils; a plurality of capacitors coupled to a phase detector; and switching means connected in series with said coils for connecting a selected one of said capacitors in series with said coils, and accordingly varying with the width of the viewed image.

2. Means for varying the width of the raster of a television picture tube, comprising: a horizontal output transformer coupled to a horizontal deflection coil; a plurality of capacitors coupled to a phase detector; and switching means for selectively connecting said capacitors individually in series with said coil.

3. In a television receiver of the type including a horizontal-output beam deflecting transformer for supplying both beam-deflecting and beam-accelerating voltages, a horizontal beam-deflection coil, a plurality of capacitors having different capacitance values, and circuit means including a selective switch for selectively connecting said coil and any selected one of said capacitances, in series combination, across a portion of a winding of said transformer.

References Cited in the file of this patent

UNITED STATES PATENTS

| | | |
|---|---|---|
| 2,077,574 | Maloff | Apr. 20, 1937 |
| 2,449,792 | Snyder | Sept. 21, 1948 |
| 2,896,114 | Maloff | July 21, 1959 |

OTHER REFERENCES

General Electric Co., Technical Service Section, RSM-4-TV-15, April 7, 1952, Television—Principles and Practices, by K. Fowler and H. Lippert, page 297.